(12) United States Patent
Stark et al.

(10) Patent No.: US 12,415,153 B2
(45) Date of Patent: Sep. 16, 2025

(54) FILTER ELEMENT AND FILTER SYSTEM

(71) Applicant: MANN+HUMMEL GmbH, Ludwigsburg (DE)

(72) Inventors: Dennis Stark, Mauer (DE); Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 275 days.

(21) Appl. No.: 18/173,999

(22) Filed: Feb. 24, 2023

(65) Prior Publication Data

US 2023/0191305 A1 Jun. 22, 2023

Related U.S. Application Data

(63) Continuation of application No. PCT/EP2021/073281, filed on Aug. 23, 2021.

(51) Int. Cl.
*B01D 46/24* (2006.01)
*B01D 46/00* (2022.01)

(52) U.S. Cl.
CPC ..... *B01D 46/2414* (2013.01); *B01D 46/0005* (2013.01); *B01D 2271/022* (2013.01); *B01D 2271/027* (2013.01); *B01D 2277/30* (2013.01); *B01D 2279/60* (2013.01)

(58) Field of Classification Search
CPC ........... B01D 46/2414; B01D 46/0005; B01D 2271/022; B01D 2271/027; B01D 2279/60

USPC .......................................................... 55/502
See application file for complete search history.

(56) References Cited

U.S. PATENT DOCUMENTS

| | | | |
|---|---|---|---|
| 3,190,058 | A | 6/1965 | Farr et al. |
| 5,947,072 | A | 9/1999 | Loy et al. |
| 7,892,307 | B2 | 2/2011 | Freisinger et al. |
| 10,245,541 | B2 | 4/2019 | Kaufmann et al. |
| 11,136,947 | B2 | 10/2021 | Von Seggern et al. |
| 2005/0061292 | A1 | 3/2005 | Prellwitz et al. |
| 2006/0278192 | A1 | 12/2006 | Now |
| 2009/0049830 | A1 | 2/2009 | Suzuki |

(Continued)

FOREIGN PATENT DOCUMENTS

| | | |
|---|---|---|
| CN | 205736803 U | 11/2016 |
| CN | 108656899 A | 10/2018 |

(Continued)

*Primary Examiner* — Qianping He

(57) ABSTRACT

A filter element has a filter medium arranged between first and second end disks. The first end disk has a positioning and sealing section having external positioning recesses for engaging disturbance geometries of a filter housing with form fit to position the filter element circumferentially in the filter housing. The positioning and sealing section has an inner interface for radially sealing and axially positioning the filter element relative to the filter housing. The interface, viewed along a longitudinal direction from first toward second end disk, extends farther into the positioning and sealing section than the positioning recesses. The interface has an annular seal groove surrounding a symmetry axis of the filter element and configured to engage a seal rib of the filter housing with form fit for axial positioning relative to the filter housing. A filter system is provided with such a filter element in its filter housing.

16 Claims, 11 Drawing Sheets

(56) References Cited

U.S. PATENT DOCUMENTS

| | | |
|---|---|---|
| 2011/0203240 A1 | 8/2011 | Langner |
| 2012/0067014 A1* | 3/2012 | Dhiman .............. B01D 46/88 55/502 |
| 2012/0204846 A1 | 8/2012 | Schultz et al. |
| 2013/0086877 A1 | 4/2013 | Kori et al. |
| 2013/0152524 A1 | 6/2013 | Gensler et al. |
| 2013/0152528 A1 | 6/2013 | Disson et al. |
| 2014/0102058 A1* | 4/2014 | Kaufmann ........... B01D 46/56 55/482 |
| 2014/0137525 A1 | 5/2014 | Cambpell et al. |
| 2014/0165834 A1 | 6/2014 | Kaufmann et al. |
| 2014/0223868 A1 | 8/2014 | Kaufmann et al. |
| 2014/0260136 A1 | 9/2014 | Kaiser |
| 2015/0082982 A1 | 3/2015 | Ruhland et al. |
| 2016/0069307 A1 | 3/2016 | Tucker et al. |
| 2016/0102637 A1 | 4/2016 | Desjardins |
| 2017/0319997 A1 | 11/2017 | Jerger |
| 2018/0036666 A1 | 2/2018 | Williams et al. |
| 2018/0229174 A1 | 8/2018 | Mercier et al. |
| 2018/0361292 A1 | 12/2018 | Adamek et al. |
| 2018/0369732 A1 | 12/2018 | Karlsson et al. |
| 2018/0372036 A1* | 12/2018 | Von Seggern ..... B01D 46/2414 |
| 2019/0308125 A1 | 10/2019 | Neef et al. |
| 2020/0001221 A1 | 1/2020 | Nelson et al. |
| 2020/0376425 A1 | 12/2020 | Neef |
| 2022/0018316 A1 | 1/2022 | Holzmann et al. |

FOREIGN PATENT DOCUMENTS

| | | |
|---|---|---|
| CN | 108928217 A | 12/2018 |
| CN | 109372666 A | 2/2019 |
| DE | 10328002 A1 | 1/2005 |
| DE | 202005001693 U1 | 6/2006 |
| DE | 202007018072 U1 | 5/2009 |
| DE | 102012112653 A1 | 6/2014 |
| DE | 102013001843 A1 | 8/2014 |
| DE | 102014006117 A1 | 10/2015 |
| DE | 102015004089 A1 | 12/2015 |
| DE | 102018129695 A1 | 5/2019 |
| DE | 102019109202 A1 | 2/2020 |
| DE | 102020130138 A1 | 12/2021 |
| DE | 102020130142 B3 | 2/2022 |
| EP | 2213869 A2 | 8/2010 |
| EP | 3112658 A1 | 1/2017 |
| WO | 2016061604 A1 | 4/2016 |
| WO | 2019112560 A1 | 6/2019 |

* cited by examiner

FILTER ELEMENT AND FILTER SYSTEM

CROSS-REFERENCE TO RELATED APPLICATIONS

This application is a continuation application of international application No. PCT/EP2021/073281 having an international filing date of 23 Aug. 2021 and designating the United States, the international application claiming a priority date of 24 Aug. 2020 based on prior filed German patent application No. 10 2020 122 024.3, the entire contents of the aforesaid international application and the aforesaid German patent application being incorporated herein by reference.

BACKGROUND OF THE INVENTION

The present invention concerns a filter element and a filter system with such a filter element.

A filter system, for example, an air filter system, comprises a filter housing and a filter element received in the filter housing so as to be removable. Such a filter element can comprise a folded filter medium which is placed between two end disks and is fixedly connected to them. At least one of the end disks can comprise a seal element with which the filter element can be sealed in relation to the filter housing. Furthermore, this end disk can also have a contour in which a corresponding counter contour of the filter housing can engage with form fit. In this way, it is ensured that only filter elements matching the filter system can be installed in the filter housing. This means filter elements without such a matching contour cannot be installed in the filter housing.

WO 2012/172019 A1 shows an air filter system comprising a housing with a housing top part and an air filter element for filtering air. The housing comprises a clean air socket for discharge of clean air from the housing and a seal receptacle for form fit connection to a cylindrical seal of the air filter element and for holding the air filter element, wherein the seal receptacle comprises a cylindrical seal surface extending from the housing top part into the interior of the housing, the seal surface enclosing the clean air socket and the seal of the air filter element contacting it radially, wherein at the seal surface an annular collar which is projecting radially past the seal surface is arranged which can be gripped with form fit by the seal of the air filter element.

SUMMARY OF THE INVENTION

In view of this background, the present invention has the object to provide an improved filter element.

Accordingly, a filter element for a filter system is proposed. The filter element comprises a filter medium, a first end disk connected to the filter medium, and a second end disk connected to the filter medium, wherein the filter medium is arranged between the first end disk and the second end disk, wherein the first end disk comprises a positioning and sealing section facing away from the filter medium, wherein the positioning and sealing section comprises external positioning recesses which are configured such that disturbance geometries of a filter housing of the filter system engage with form fit the positioning recesses in order to position the filter element circumferentially in relation to the filter housing, wherein the positioning and sealing section comprises at the inner side an interface which is configured to seal the filter element radially in relation to the filter housing and to position it axially in relation to the filter housing, wherein the interface, viewed along a longitudinal direction of the filter element which is oriented from the first end disk in the direction toward the second end disk, extends farther into the positioning and sealing section than the positioning recesses, wherein the interface comprises a seal groove in the form of an annular groove which extends circumferentially completely about a symmetry axis of the filter element, and wherein the seal groove is configured such that a seal rib of the filter housing engages with form fit the seal groove in order to position the filter element axially in relation to the filter housing.

Because the interface extends farther into the positioning and sealing section than the positioning recesses, it can be achieved that an interface of the filter housing which is projecting past the disturbance geometries in the longitudinal direction can be guided at the interface of the filter element. In this way, the filter element is guided at the filter housing when the filter element is rotated relative to the filter housing in order to position it in relation to the filter housing.

The filter element is preferably an air filter element. The filter element is in particular suitable for purifying air supplied to an air compressor. The filter medium is preferably folded. The filter medium forms in particular a circumferentially closed folded bellows. The end disks are preferably manufactured of a plastic material. For example, the end disks are foamed or cast onto the filter medium at the end face. Preferably, the first end disk as well as the second end disk are fixedly connected to the filter medium. The filter element is preferably constructed with rotational symmetry in relation to a center or symmetry axis. Also, the end disks are in particular constructed with rotational symmetry in relation to this symmetry axis. However, the filter element can also have an oval geometry in cross section. In this case, the filter element is not constructed with rotational symmetry in relation to the symmetry axis.

As an alternative, the positioning and sealing section can be provided also at the second end disk. The positioning and sealing section is configured as one piece, in particular monolithic as one piece, together with the first end disk. "One piece" or "one part" means presently that the first end disk and the positioning and sealing section form a common component and are not assembled of different components. "Monolithic as one piece" means presently that the first end disk and the positioning and sealing section are manufactured throughout of the same material.

The positioning and sealing section extends at the end face away from an end surface of the first end disk which is facing away from the filter medium. The positioning and sealing section is constructed with rotational symmetry in relation to the symmetry axis and extends circumferentially completely around it. The positioning and sealing section is thus preferably of an annular shape. The number of the positioning recesses is arbitrary. That the positioning recesses are "externally" arranged at the positioning and sealing section means presently that the positioning recesses face away from the symmetry axis.

A form fit connection is produced by two connection partners, presently the disturbance geometries of the filter housing and the positioning recesses of the filter element, mutually engaging each other or engaging from behind. In this context, the disturbance geometries, in a mounted state of the filter element, engage with form fit the positioning recesses so that the filter element cannot be rotated relative to the filter housing. As long as these disturbance geometries do not yet engage the positioning recesses, it is possible to rotate the filter element in relation to the filter housing. The filter element can be rotated in relation to the filter housing until the positioning recesses are aligned with the corresponding disturbance geometries so that the disturbance geometries engage the positioning recesses.

As soon as the disturbance geometries engage in the positioning recesses, the filter element can be inserted in an insertion direction, which is preferably opposite to the longitudinal direction of the filter element, into the filter housing. In this way, the interface of the filter element seals in relation to the filter housing. The filter housing comprises preferably an interface which corresponds to the interface of the filter element. That the positioning recesses are suitable to position the filter element "circumferentially" in relation to the filter housing means therefore presently that a rotation of the filter element in relation to the filter housing is no longer possible when the disturbance geometries engage the positioning recesses.

That the interface is arranged "at the inner side" at the positioning and sealing section means presently that the interface is arranged so as to face the symmetry axis. Preferably, the interface is cylinder-shaped. The interface extends preferably completely around the symmetry axis. The interface is at least in sections resiliently deformable so that it can be radially compressed in relation to the filter housing. "Radial" means in this context along a radial direction oriented perpendicularly to the symmetry axis and facing away from it. For sealing the filter element in relation to the filter housing, the interface at least in sections is radially compressed and resiliently deformed thereby.

That the interface is suitable for positioning the filter element "axially" in relation to the filter housing is to be understood presently in particular such that a fixation or positioning of the filter element along the longitudinal direction or along the insertion direction is possible by means of the interface. For this purpose, the filter housing can engage the interface, for example, with form fit. That the interface, viewed along the longitudinal direction, extends farther into the positioning and sealing section than the positioning recesses means presently that the interface, in relation to a circumferentially extending end surface of the positioning and sealing section, comprises a larger depth than the positioning recesses.

In embodiments, the interface comprises a circumferentially extending sealing surface which is configured to seal the filter element radially in relation to the filter housing, wherein the seal groove, viewed along the longitudinal direction, is arranged behind the seal surface. This means that the seal rib engages the seal groove not until the seal surface of the filter element is compressed relative to a seal surface of the filter housing. The seal surface comprises preferably a circular cylindrical geometry which extends circumferentially completely around the symmetry axis. When radially sealing the filter element in relation to the filter housing, the seal surface is compressed so that the positioning and sealing section is deformed, at least in sections. The seal groove is in particular an annular groove which extend circumferentially completely around the symmetry axis. The seal groove, viewed along the longitudinal direction, is arranged adjacent to the seal surface. This means that the seal groove and the seal surface are positioned adjacent to each other.

In embodiments, the interface comprises a circumferentially extending surface which is positioned such that the seal groove, viewed along the longitudinal direction, is arranged between the seal surface and the surface, wherein the surface, viewed along the longitudinal direction, extends farther into the positioning and sealing section than the positioning recesses. The surface extends circumferentially completely around the symmetry axis and comprises preferably a circular cylindrical geometry. In a mounted state of the filter element, the surface is preferably not in contact with the filter housing. This means that between the filter housing and the surface a gap is provided, in particular an air gap.

In embodiments, the surface comprises a larger diameter than the seal surface. This means in particular that the surface, viewed in the radial direction, extends farther into the positioning and sealing section than the seal surface.

In embodiments, the positioning recesses extend, viewed along the longitudinal direction, farther into the positioning and sealing section than the seal surface. This means that the positioning recesses, viewed along the longitudinal direction, comprise a larger depth than the seal surface. In other words, the seal surface ends, viewed along the longitudinal direction, in front of the positioning recesses.

In embodiments, the first end disk is open and the second end disk is closed. In reverse, also the first end disk can be closed and the second end disk open. Furthermore, also both end disks can be open. "Open" means presently that the respective end disk has a passage, in particular an outflow opening, through which a fluid, for example air, can flow out of an interior of the filter element. The passage is preferably constructed with rotational symmetry in relation to the symmetry axis.

In embodiments, the positioning recesses are arranged distributed uniformly or non-uniformly about a circumference of the filter element. In particular, the positioning recesses are arranged uniformly or non-uniformly distributed about the symmetry axis. "Uniformly" means presently that circumferential angles between the individual positioning recesses or distances between the individual positioning recesses are constant or identical. "Non-uniformly" means presently that circumferential angles between the individual positioning recesses or distances between the individual positioning recesses are differently sized. The number of positioning recesses is arbitrary. For example, at least three positioning recesses are provided. However, also four positioning recesses, five positioning recesses, six positioning recesses or more than six positioning recesses can be provided.

Furthermore, a filter system with a filter housing and such a filter element is proposed. In this context, the filter housing comprises disturbance geometries which engage with form fit the positioning recesses of the filter element, wherein the filter housing comprises a seal surface with which the interface of the filter element, at least in sections, is radially compressed, and wherein a respective end surface of the disturbance geometries, viewed along the longitudinal direction, is arranged behind the seal surface of the filter housing.

This means the end surface of the disturbance geometry is leading relative to the seal surface of the filter housing. In other words, the filter element, upon installation in the filter housing, first contacts the end surface of the disturbance geometries prior to the interface of the filter element sealing relative to the seal surface of the filter housing. The filter housing comprises preferably a housing bottom part as well as a housing top part which can be separated from each other in order to exchange the filter element. The housing bottom part is in particular cup-shaped and comprises a bottom section as well as a hollow cylindrical base section connected to the bottom section so as to form one piece. The interface of the housing bottom part is provided at the bottom section and comprises the seal surface of the filter housing. The interface of the filter element is suitable for interacting with the interface of the filter housing such that the filter element is sealed in relation to the filter housing and positioned relative thereto. Also, the disturbance geometries are provided preferably at the bottom section. The housing bottom part comprises furthermore a laterally arranged fluid inlet as well as a fluid outlet arranged at the bottom section. The fluid inlet is preferably arranged perpendicularly to the symmetry axis. The fluid outlet, on the other hand, is preferably constructed with rotational symmetry in relation to the symmetry axis.

In embodiments, the positioning and sealing section of the filter element, upon installation thereof in the filter housing, contacts with the end face first the disturbance geometries, wherein the disturbance geometries by means of a rotation of the filter element in relation to the filter housing can be brought into form fit engagement with the positioning recesses. This means that the filter element is first inserted in the insertion direction into the filter housing, in particular the filter housing bottom part, until the positioning and sealing section rests on the disturbance geometries. By a rotation of the filter element in relation to the filter housing, the positioning recesses now can come to engage the disturbance geometries so that the filter element can be inserted farther into the housing bottom part in order to seal the filter element in relation to the filter housing.

In embodiments, a seal surface of the interface of the filter element, upon installation of the filter element in the filter housing, contacts the seal surface of the filter housing not until the disturbance geometries are in form fit engagement with the positioning recesses. This means that the filter element, as mentioned before, can be inserted farther into the filter housing only when the disturbance geometries are aligned with the positioning recesses.

In embodiments, the disturbance geometries comprise, viewed along the longitudinal direction, a larger depth than the seal surface of the interface. The depth is measured in particular as a distance of an end surface of the positioning and sealing section in relation to an end surface of the first end disk.

In embodiments, the filter housing comprises a seal rib which engages with form fit a seal groove of the interface of the filter element, wherein the seal rib, viewed along the longitudinal direction, is arranged behind the seal surface of the filter housing. The seal rib is annular and extends circumferentially completely around the symmetry axis. Since the seal rib, viewed along the longitudinal direction, is arranged behind the seal surface of the filter housing, the seal rib engages the seal groove not until the seal surface of the interface of the filter element contacts the seal surface of the interface of the filter housing and is radially compressed relative thereto.

In embodiments, the filter housing comprises a centering surface, wherein the centering surface, viewed along the longitudinal direction, is arranged behind the seal rib of the filter housing. The centering surface is preferably circular cylindrical and extends circumferentially completely around the symmetry axis. At the centering surface, the seal surface of the interface of the filter element is guided as long as the disturbance geometries have not yet engaged the positioning recesses of the positioning and sealing section of the filter element, i.e., as long as the positioning and sealing section is resting with the end face on the disturbance geometries and the filter element is rotatable relative to the filter housing.

In embodiments, between the centering surface of the filter housing and the interface of the filter element, a circumferential gap is provided in an installed state of the filter element in the filter housing. The gap is in particular an air gap. In the installed state of the filter element, the disturbance geometries engage with form fit the positioning recesses so that the seal surface of the filter element is radially compressed with the seal surface of the filter housing.

In embodiments, the disturbance geometries are arranged distributed uniformly or non-uniformly about a circumference of the filter housing. The number of disturbance geometries is arbitrary. For example, three or five such disturbance geometries are provided. "Uniformly" means presently that a circumferential angle or distance between the individual disturbance geometries is constant. "Non-uniformly" means presently that the circumferential angle or distance between the individual disturbance geometries is non-uniform.

BRIEF DESCRIPTION OF DRAWINGS

In the Figures, same or functionally the same elements, if nothing to the contrary is indicated, are provided with the same reference characters.

DETAILED DESCRIPTION OF THE INVENTION

Figure 1:
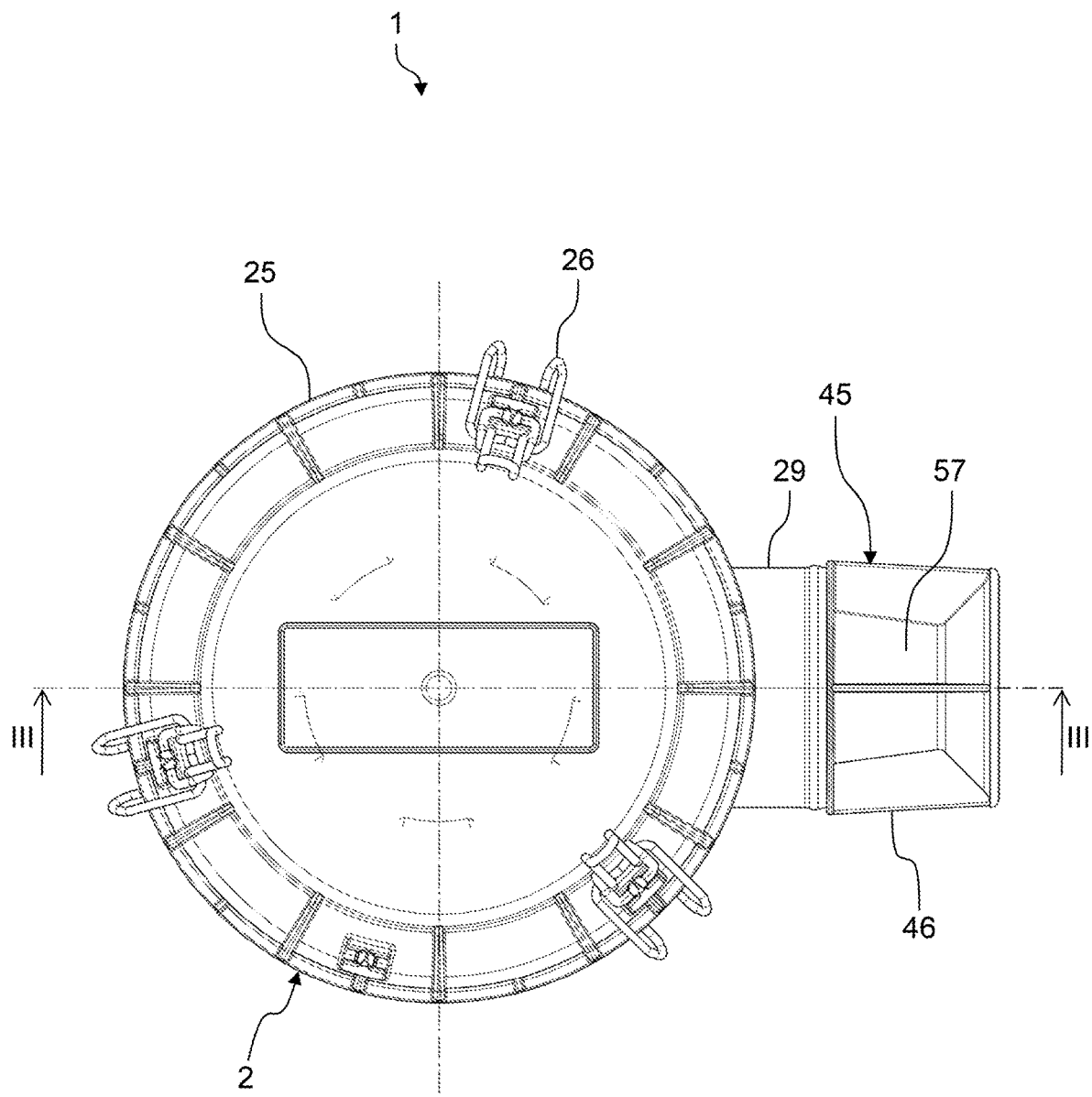
FIG. 1 shows a schematic plan view of an embodiment of a filter system.
Figure 2:
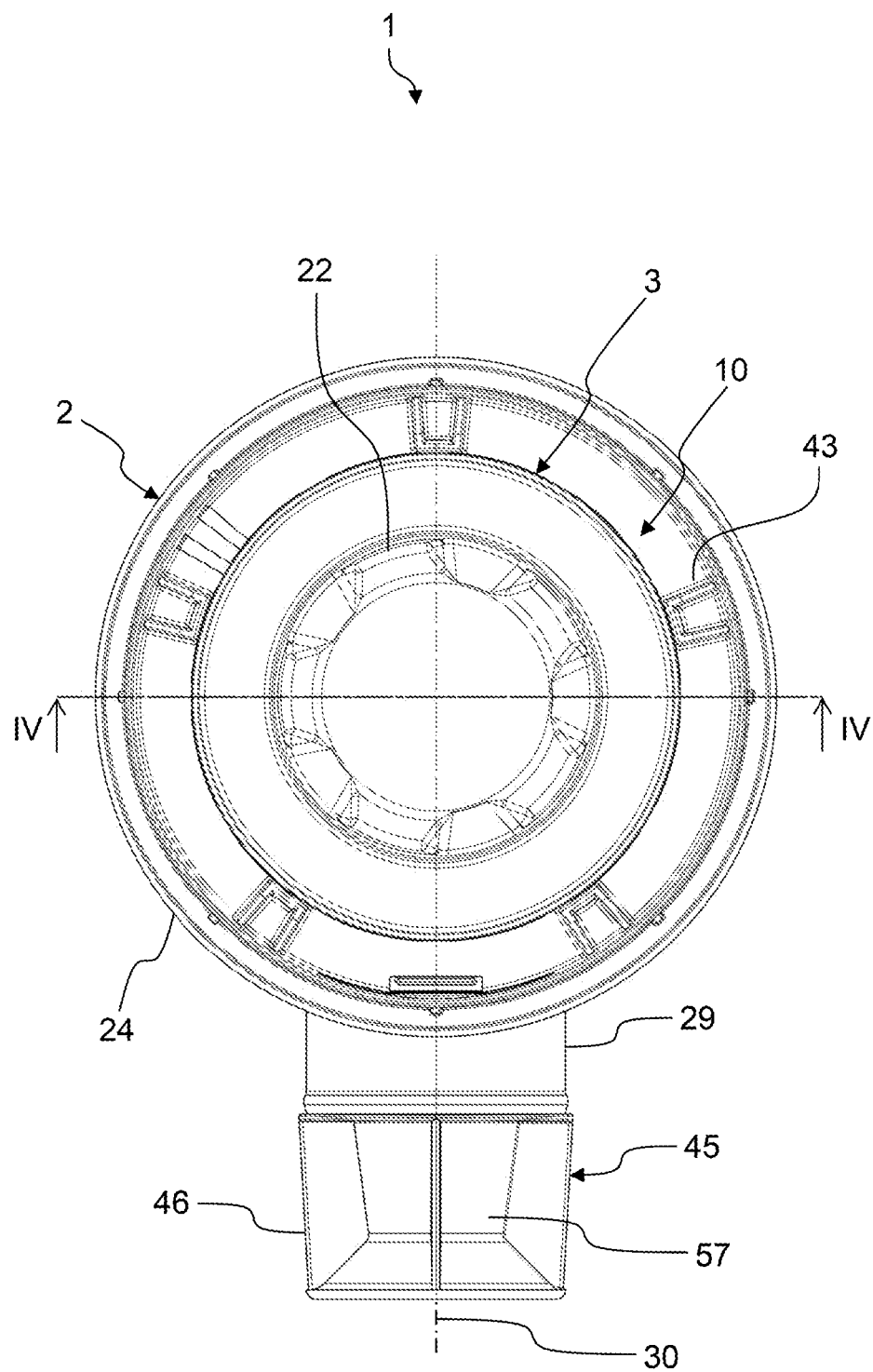
FIG. 2 shows a further schematic plan view of the filter system according to FIG. 1.
Figure 3:
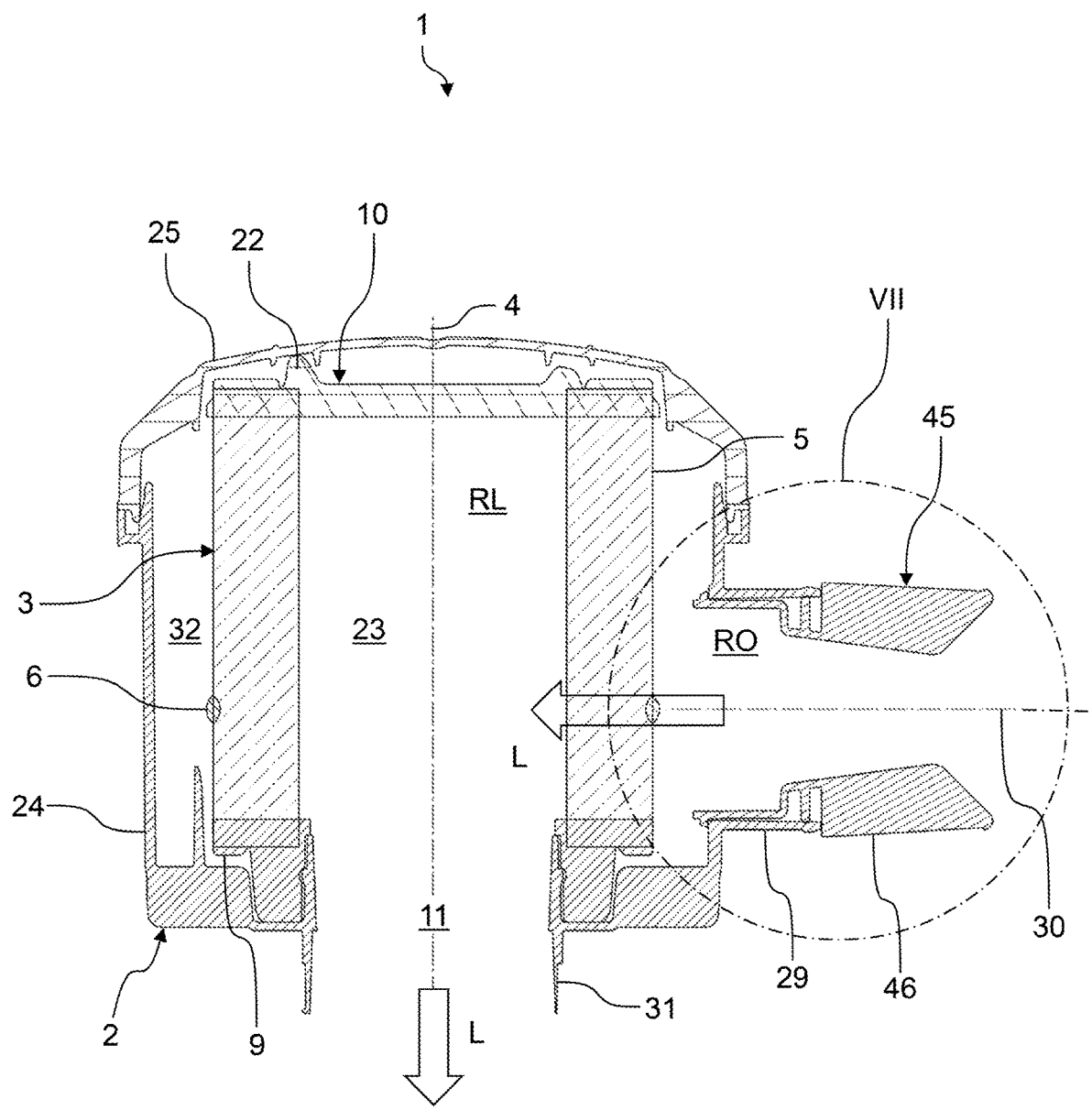
FIG. 3 shows a schematic section view of the filter system according to the section line III-III of FIG. 1.
Figure 4:
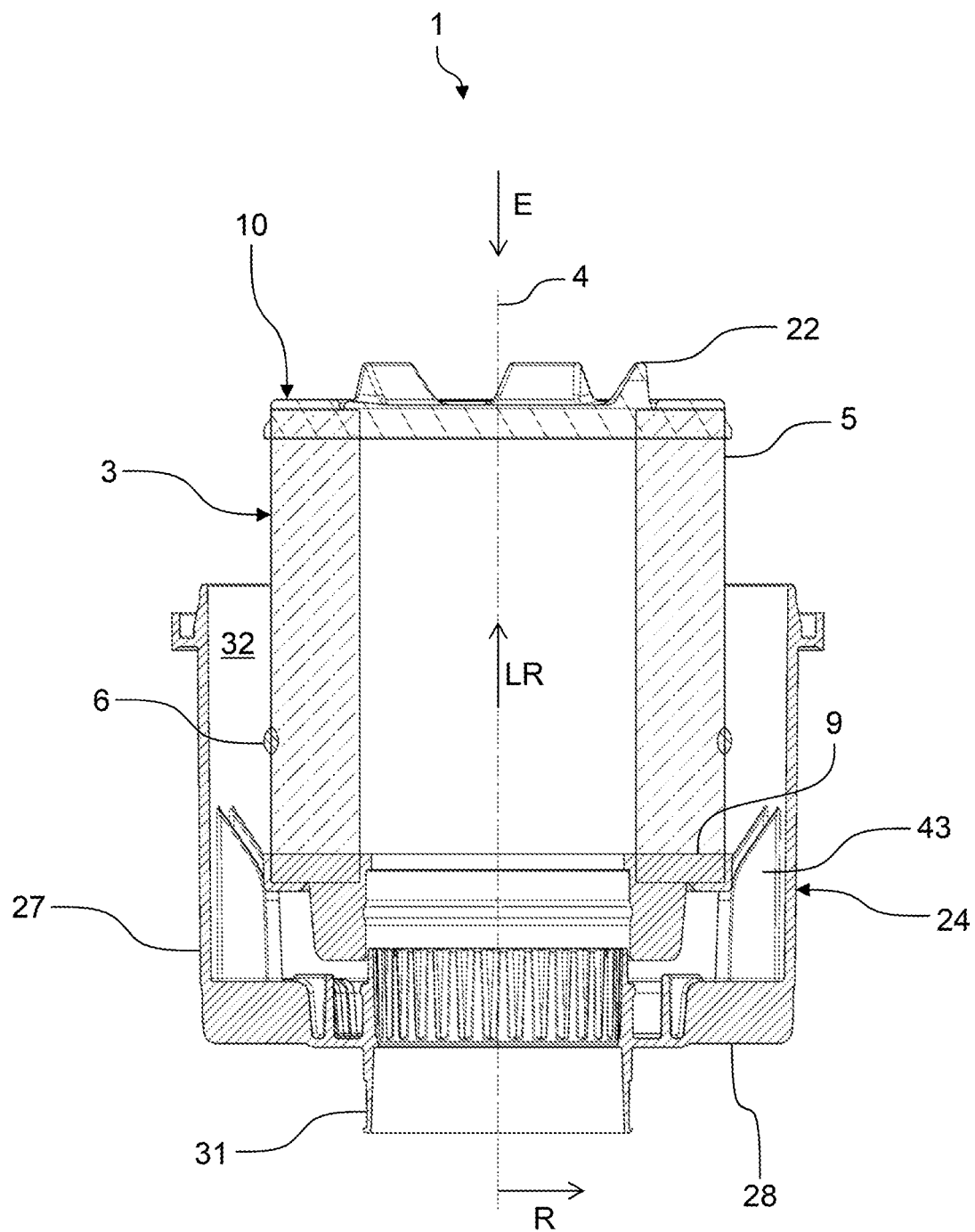
FIG. 4 shows a further schematic section view of the filter system according to the section line IV-IV of FIG. 2.
Figure 5:
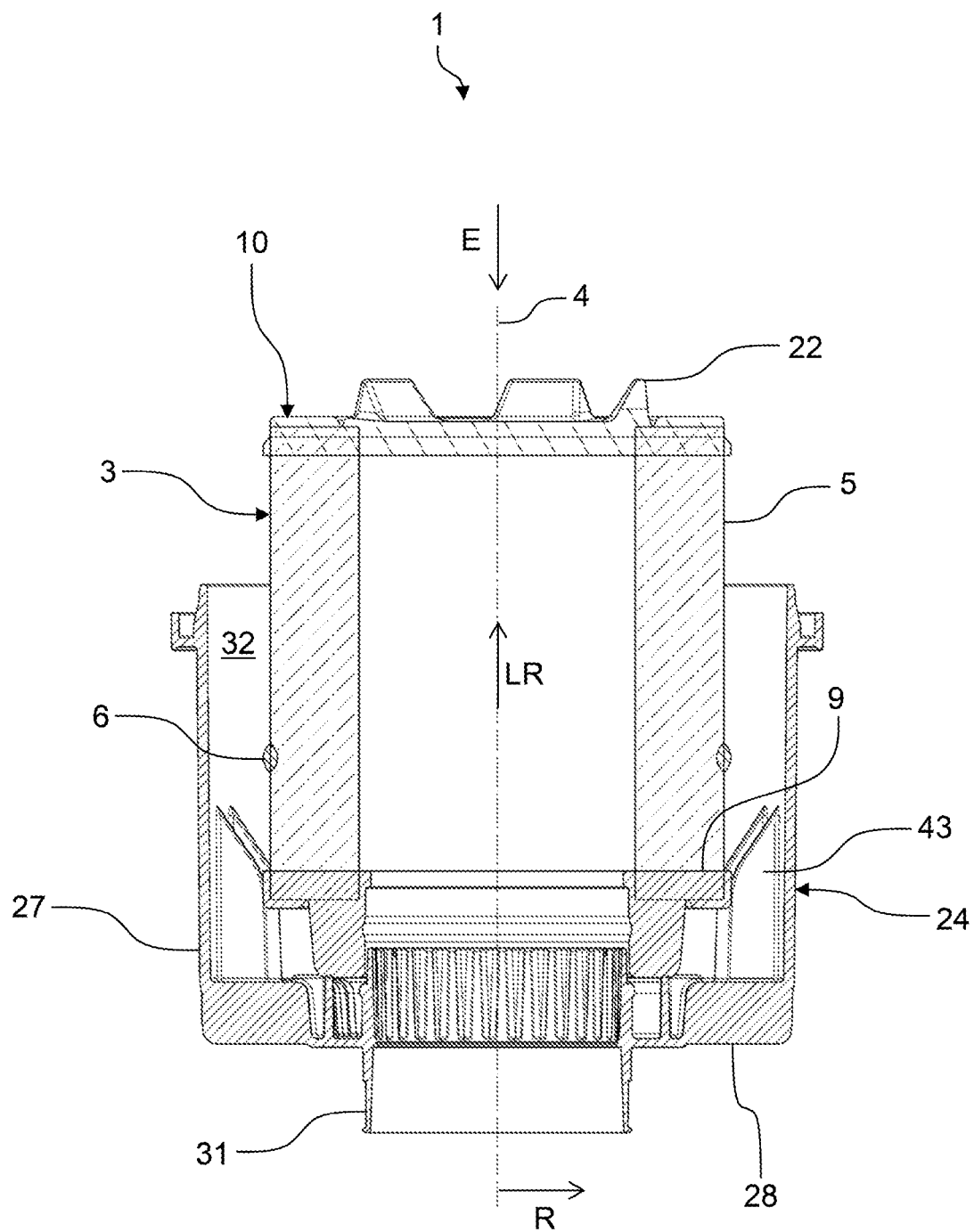
FIG. 5 shows a further schematic section view of the filter system according to the section line IV-IV of FIG. 2.
Figure 6:
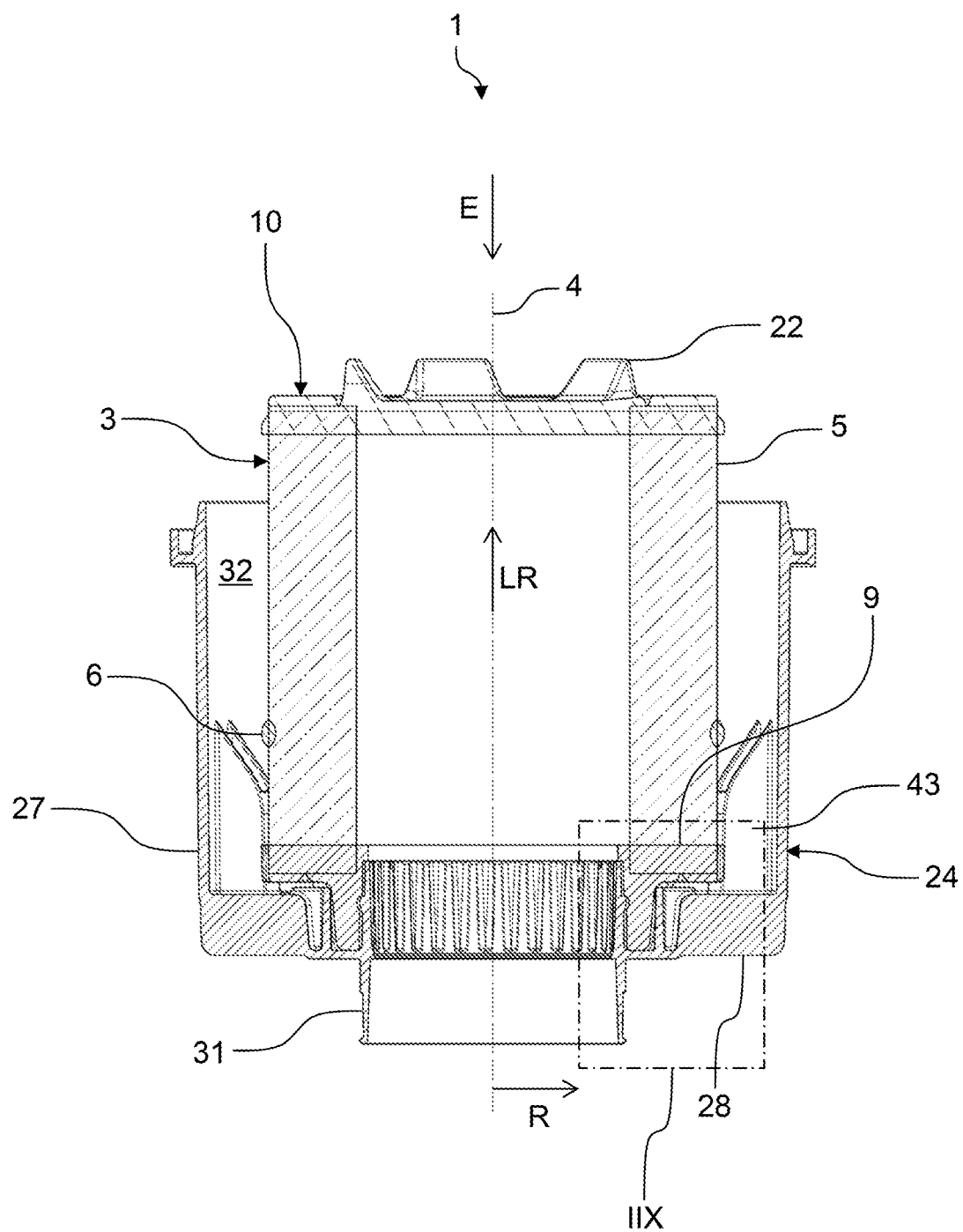
FIG. 6 shows a further schematic section view of the filter system according to the section line IV-IV of FIG. 2.
Figure 7:
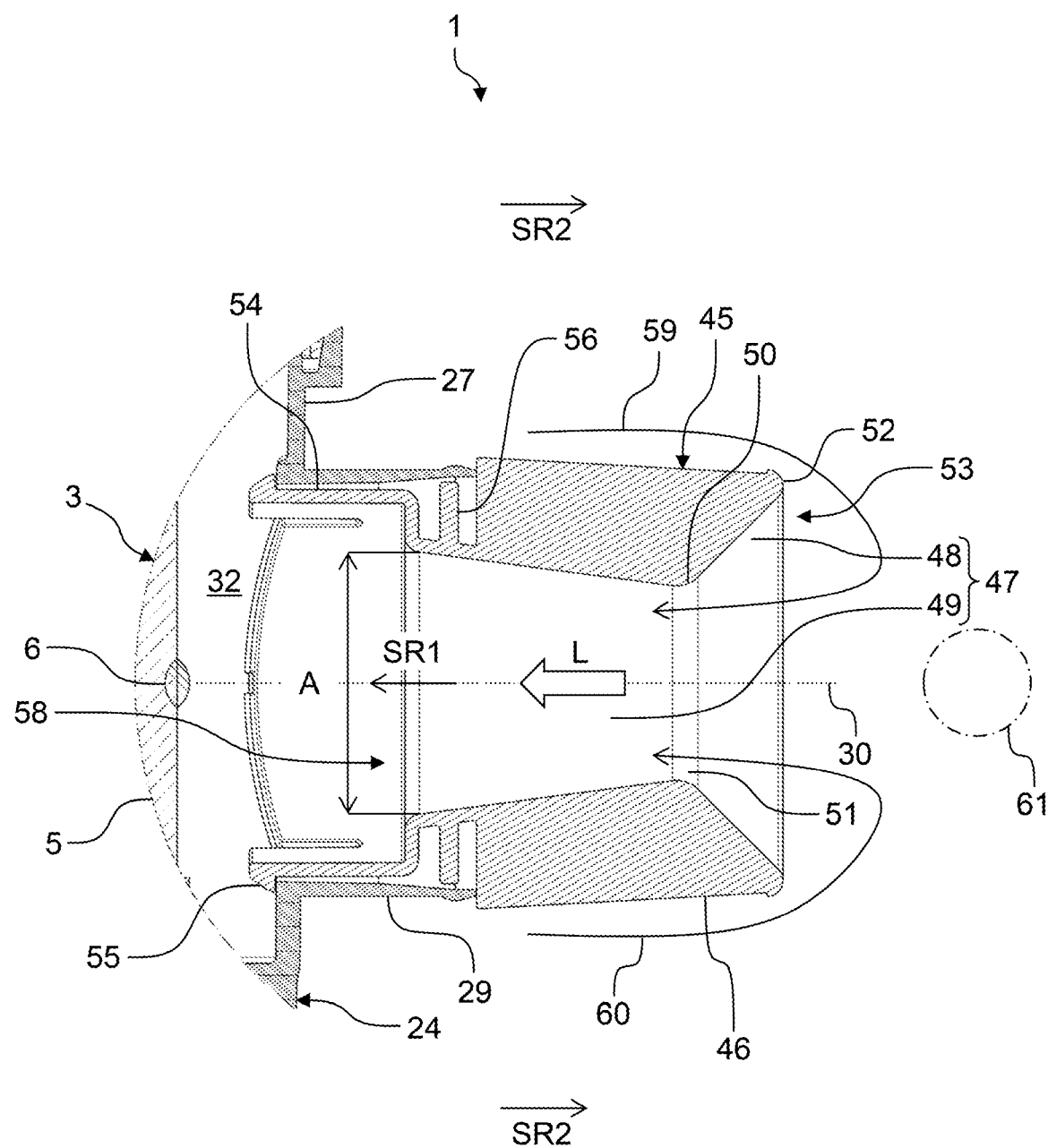
FIG. 7 shows a detail view VII according to FIG. 3.
Figure 8:
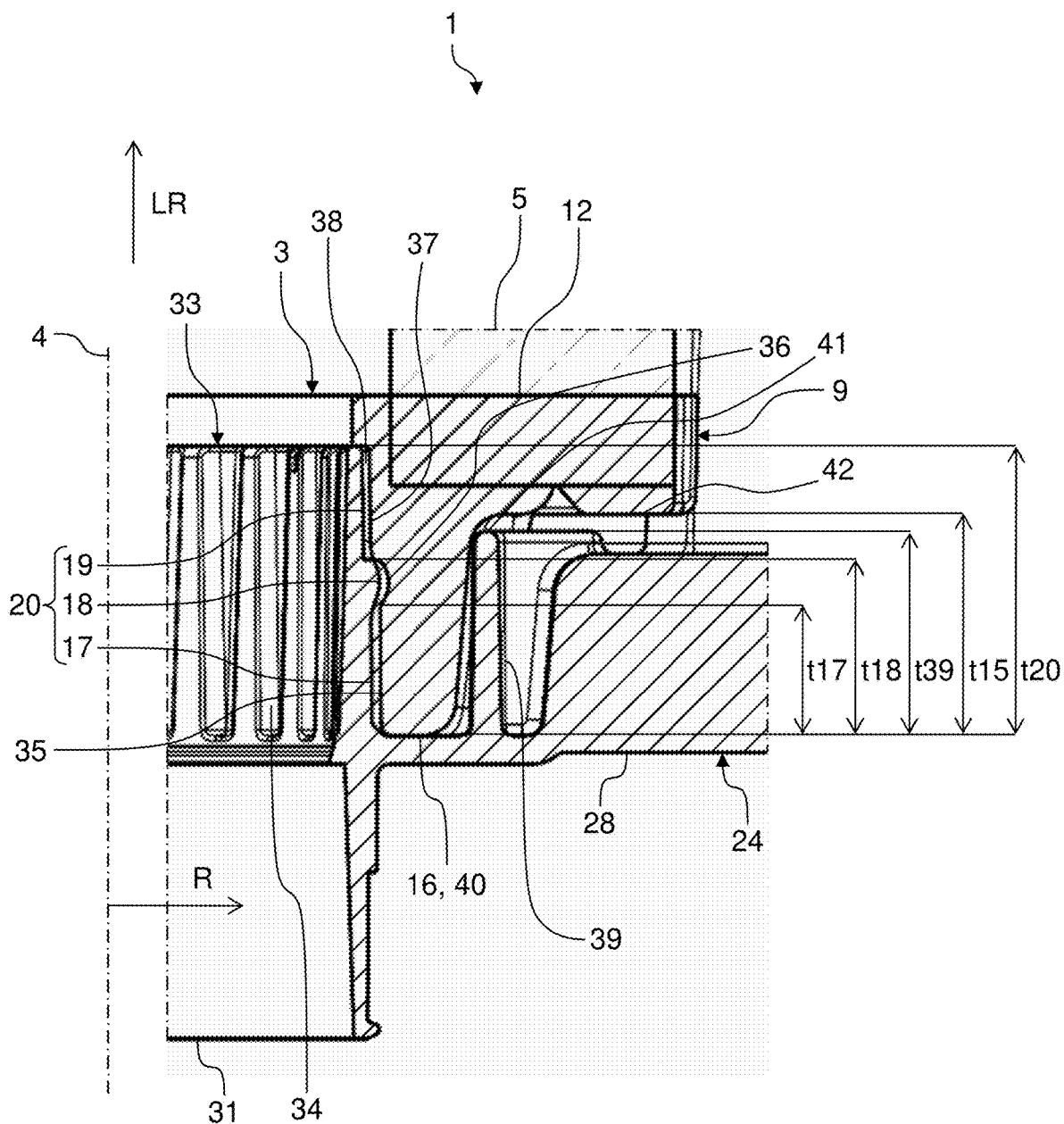
FIG. 8 shows a detail view IIX according to FIG. 6.
Figure 9:
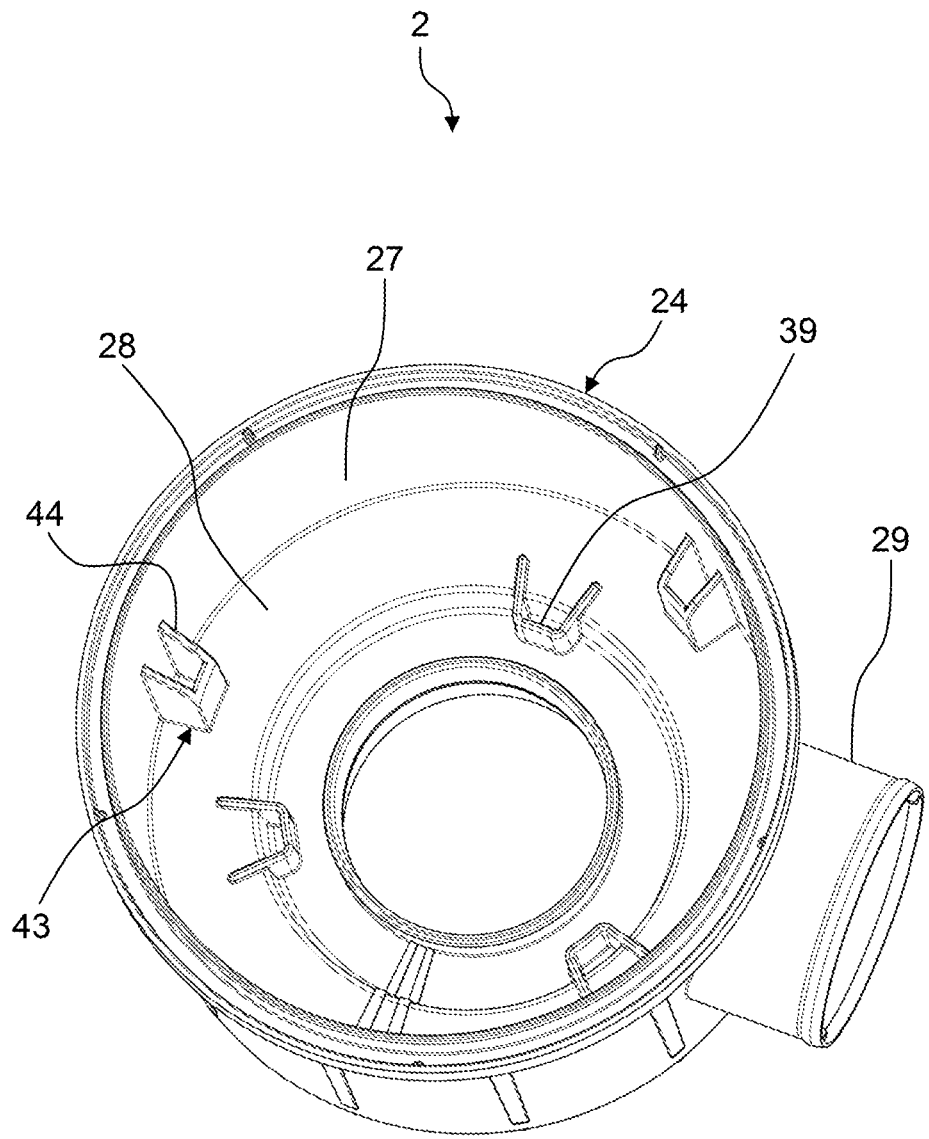
FIG. 9 shows a schematic perspective view of an embodiment of a filter housing for the filter system according to FIG. 1.
Figure 10:
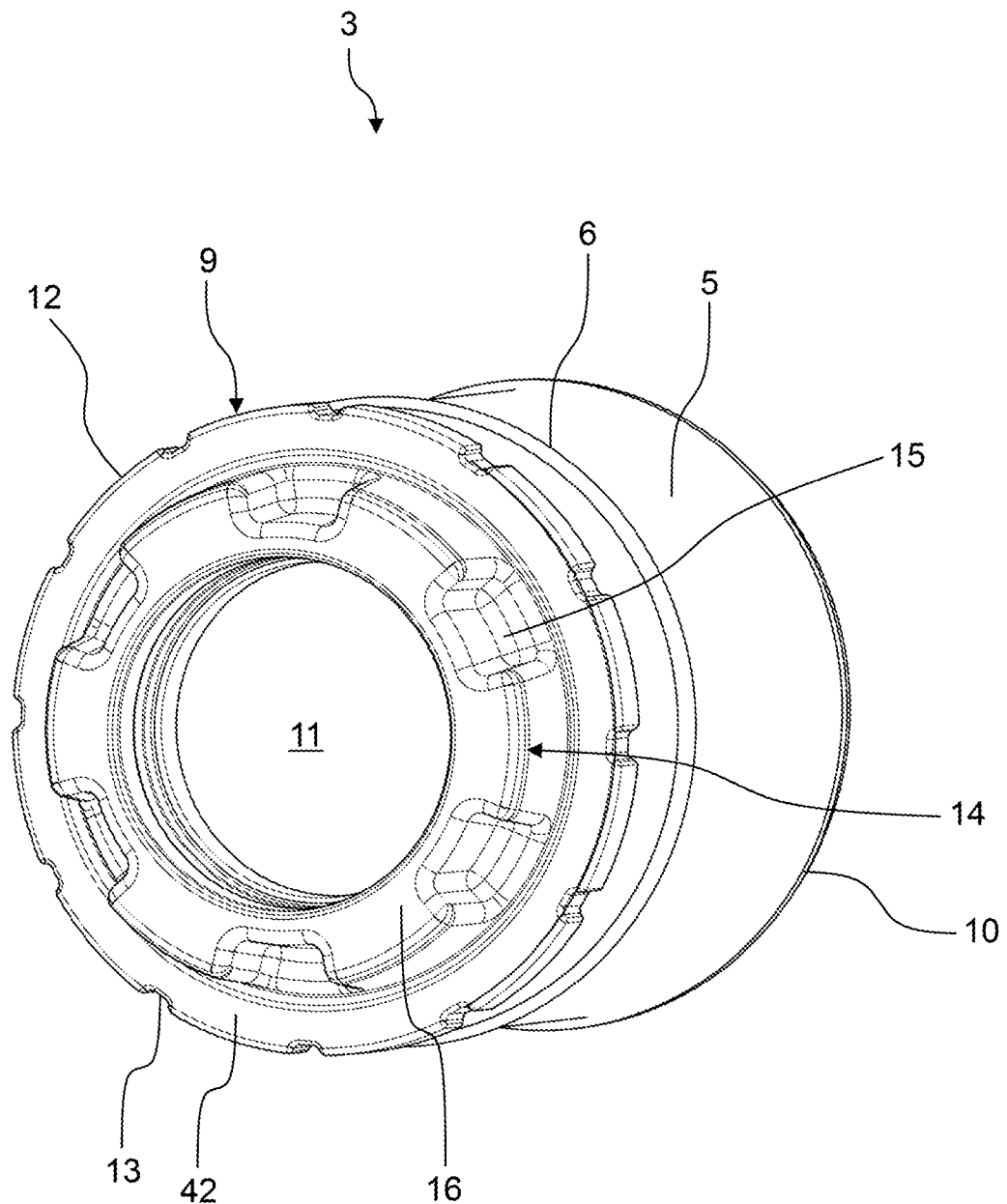
FIG. 10 shows a schematic perspective view of an embodiment of a filter element for the filter system according to FIG. 1.
Figure 11:
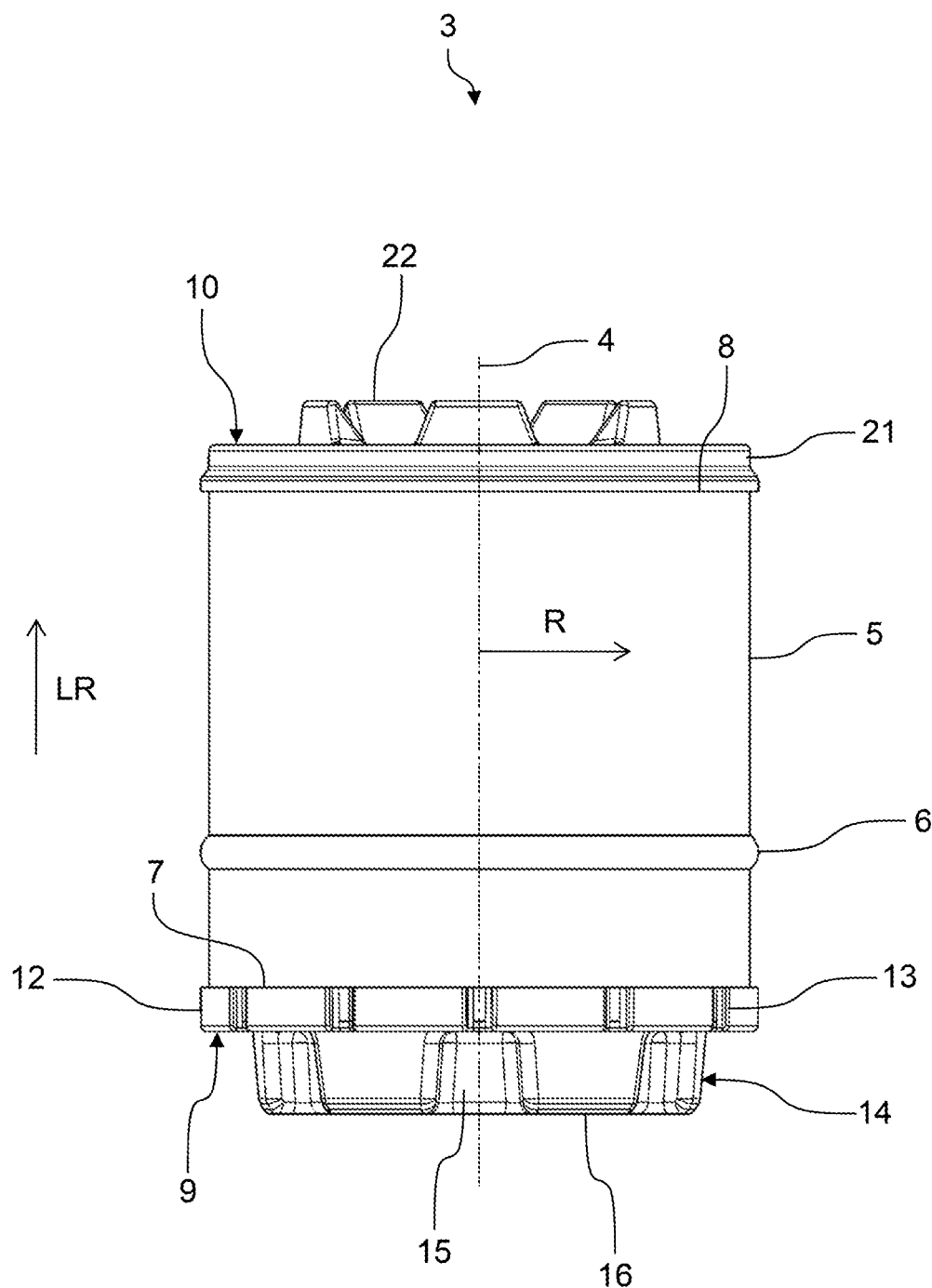
FIG. 11 shows a schematic side view of the filter element according to FIG. 10.

FIG. 1 shows a schematic plan view of an embodiment of a filter system 1. FIG. 2 shows a further schematic plan view of the filter system 1. FIG. 3 shows a schematic section view of the filter system 1 according to the section line III-III of FIG. 1. FIG. 4 shows a further schematic section view of the filter system 1 according to the section line IV-IV of FIG. 2. FIG. 5 shows a further schematic section view of the filter system 1 according to the section line IV-IV of FIG. 2. FIG. 6 shows a further schematic section view of the filter system 1 according to the section line IV-IV of FIG. 2. FIG. 7 shows the detail view VII according to FIG. 3. FIG. 8 shows the detail view IIX according to FIG. 6. FIG. 9 shows a schematic perspective view of an embodiment of a filter housing 2 for the filter system 1. FIG. 10 shows a schematic perspective view of an embodiment of a filter element 3 for the filter system 1. FIG. 11 shows a schematic side view of the filter element 3. In the following, reference is being had to FIGS. 1 through 11 at the same time.

The filter system 1 can also be referred to as filter assembly. The filter system 1 is used preferably as intake air filter for air compressors. Alternatively, the filter system 1 can however be used also as intake air filter for internal combustion engines, for example, in motor vehicles, trucks, construction vehicles, watercraft, rail vehicles, agricultural machines or vehicles, or in aircraft. The filter system 1 can also be used in immobile applications, for example, in the building technology. The filter element 3 is suitable in particular for filtering intake air of an air compressor. Preferably, the filter element 3 is an air filter element.

The filter element 3 is constructed with rotational symmetry in relation to a center or symmetry axis 4. The filter element 3 comprises a filter medium 5 which is cylinder-shaped. The filter medium 5 is constructed with rotational symmetry in relation to the symmetry axis 4. For example, the filter medium 5 can be of a closed annular shape and can be present in the form of a folded bellows folded in a star shape. The filter medium 5 is thus preferably folded.

The folded filter medium 5 can be provided with a stabilization ring 6 for stabilization thereof. The stabilization ring 6 can also be referred to as fixation coil. The stabilization ring 6 is, for example, a strip glued onto the filter medium 5 or a glued-on string. The stabilization ring 6 can be an adhesive bead or glue bead or the like, extending circumferentially completely around the symmetry axis 4 about the filter medium 5. In particular, the stabilization ring 6 can comprise a hot melt and/or hot melt-impregnated threads, for example, at least three such threads. The stabilization ring 6 serves for stabilizing the folds of the folded filter medium 5 and to thus keep their distance relative to each other identical. The stabilization ring 6, viewed along the longitudinal direction LR of the filter element 3, is positioned off-center at the filter medium 5.

In this context, the longitudinal direction LR is oriented along the symmetry axis 4. In the orientation of FIG. 11, the longitudinal direction LR can be oriented from bottom to top. The longitudinal direction LR can however also be oriented in reverse. The stabilization ring 6 in this context is provided at the exterior at the filter medium 5. "Off-center" means presently that the stabilization ring 6 in relation to a first end face 7 and a second end face 8 of the folded filter medium 5 is not centrally arranged between the two end faces 7, 8 but, for example, closer to the first end face 7 than to the second end face 8. In particular, precisely one annular stabilization ring 6, extending circumferentially completely around the symmetry axis 4, is provided.

The filter medium 5 is, for example, a filter paper, a filter fabric, a laid filter or a filter nonwoven. In particular, the filter medium 5 can be produced by a spun-bond or melt-blown method or can comprise such a fiber layer applied onto a nonwoven or cellulose support. Furthermore, the filter medium 5 can also be felted or needled. The filter medium 5 can comprise natural fibers, such as cellulose or cotton, or synthetic fibers, for example, of polyester, polyvinyl sulfite or polytetrafluoroethylene. During processing, fibers of the filter medium 5 can be oriented in, at a slant to and/or transversely to or randomly in relation to a machine direction.

The filter element 3 comprises a first, in particular open, end disk 9 which is provided at the first end face 7 of the filter medium 5. Moreover, the filter element 3 comprises a second, in particular closed, end disk 10 which is provided at the second end face 8 of the filter medium 5. This means the filter medium 5 is positioned between the first end disk 9 and the second end disk 10. The end disks 9, 10 can be manufactured, for example, of a polyurethane material which is in particular cast in casting shells, preferably foamed. The end disks 9, 10 can also be cast onto the filter medium 5. The first end disk 9 is connected to the first end face 7. The second end disk 10 is connected to the second end face 8.

The first end disk 9 comprises a centrally arranged passage 11. The passage 11 can be an outflow opening of the filter element 3. The first end disk 9 comprises a plate-shaped base section 12 which is connected to the first end face 7 of the filter element 3. The passage 11 passes through the base section 12. The exterior of the base section 12 can be provided with a plurality of grooves or cutouts 13 which are distributed uniformly around the symmetry axis 4.

Facing away from the first end face 7 of the filter medium 5, a positioning and sealing section 14 of the first end disk 9 extending in an annular shape circumferentially around the symmetry axis 4 extends away from the base section 12. By means of the positioning and sealing section 14, the filter element 3 can be positioned in the filter housing 2 and sealed relative thereto, as will be explained in the following. The passage 11 passes also through the positioning and sealing section 14.

At the exterior, i.e., facing away from the passage 11, a plurality of positioning recesses 15 are provided at the positioning and sealing section 14 of which only one is provided with a reference character in FIGS. 10 and 11, respectively. The positioning recesses 15 are arranged distributed uniformly about the symmetry axis 4. For example, six such positioning recesses 15 are provided. The number of the positioning recesses 15 is however arbitrary. Beginning at an annular end surface 16 of the positioning and sealing section 14, the positioning recesses 15, viewed along the symmetry axis 4 or along the longitudinal direction LR, comprise a depth t15 (FIG. 8). The positioning recesses 15 extend, beginning at the end surface 16, in the direction toward the base section 12.

As also shown in FIG. 8, the first end disk 9 or the positioning and sealing section 14 at the inner side, i.e., facing the passage 11, comprises a cylindrical seal surface 17 which is constructed with rotational symmetry in relation to the symmetry axis 4 and extends circumferentially completely around it. The seal surface 17 is suitable for interacting with the filter housing 2 in order to thus seal the first end disk 9 in relation to the filter housing 2 fluid-tightly. In this context, the seal surface 17 can be radially compressed. "Radially" means in this context in a direction of a radial direction R which is perpendicularly oriented in relation to the symmetry axis 4 and is pointing away from it.

Beginning at the end surface 16, the seal surface 17 extends along the longitudinal direction LR by a depth t17 into the passage 11. An annular groove or seal groove 18 extending circumferentially in a ring shape about the symmetry axis 4 adjoins the seal surface 17. Beginning at the end surface 16, the seal groove 18 ends at a depth t18 along the longitudinal direction LR. In this context, the depth t18 is smaller than the depth t15. The depth t17 is smaller than the depth t15. Viewed along the longitudinal direction LR, a cylindrical surface 19 extending circumferentially around the symmetry axis 4 adjoins the seal groove 18. Viewed relative to the radial direction R, the seal surface 17 comprises a smaller diameter than the surface 19. The seal surface 17, seal groove 18, and the surface 19 form a seal interface or interface 20 of the filter element 3. The interface 20 can also be referred to as first interface or as filter element interface. The interface 20 is suitable for interacting with the filter housing 2. Beginning at the end surface 16 of the positioning and sealing section 14, the interface 20 comprises a depth t20. The interface 20 can comprise also the positioning recesses 15.

Now returning to FIG. 11, second end disk 10 comprises a plate-shaped base section 21 which is constructed with rotational symmetry in relation to the symmetry axis 4 and closes fluid-tightly the second end face 8 of the filter element 5. Positioning elements 22 facing away from the second end face 8, of which in FIG. 11 only one is provided with a reference character, extend away from the base section 21. The number of positioning elements 22 is arbitrary. For example, five such positioning elements 22 can be provided which are arranged uniformly distributed around the symmetry axis 4.

The function of the filter element 3 will be explained in the following with the aid of FIG. 3. Fluid L to be purified, for example, air, passes from a raw side RO of the filter element 3 through the filter medium 5 to a clean side RL of the filter element 3 surrounded by the filter medium 5. This means that fluid L flows through the filter medium 5 into an interior 23 of the filter element 3 surrounded by the filter medium 5. The purified fluid L flows out of the filter element 3 through the passage 11 of the first end disk 9 as filtered fluid L.

Now returning to the filter housing 2, the latter comprises a housing bottom part 24 and a housing top part 25. The housing top part 25 can also be referred to as housing cover. The housing top part 25 can be removed from the housing bottom part 24 for exchanging the filter element 3 and can be again mounted thereon. Between the housing bottom part 24 and the housing top part 25, a seal element, for example, in the form of an O-ring, can be provided. The housing top part 25 can comprise quick connect closures 26 of which in FIG. 1 only one is provided with a reference character. The number of quick connect closures 26 is arbitrary. For example, three such quick connect closures 26 are provided which are arranged uniformly distributed around the symmetry axis 4.

By means of the quick connect closures 26, the housing top part 25 can be connected detachably to the housing bottom part 24. For this purpose, engagement sections, for example, in the form of hooks or steps, can be provided at the housing bottom part 24, in which the quick connect closures 26 engage with form fit for connecting the housing top part 25 to the housing bottom part 24. A form fit connection is produced by mutual engagement with each other or engagement from behind of at least two connection partners, presently the quick connect closures 26 and the engagement sections. The housing top part 25 comprises furthermore engagement sections which can interact with the positioning elements 22 of the second end disk 10 of the filter element 3 in such a way that the positioning elements 22 engage with form fit the engagement sections of the housing top part 25. For example, the housing top part 25 is an injection-molded plastic part.

The housing bottom part 24 is embodied in a cup shape and comprises a cylindrical base section 27 which is constructed with rotational symmetry in relation to the symmetry axis 4. At the end face, the base section 27 is closed by means of a bottom section 28. The base section 27 and the bottom section 28 are constructed as one piece, in particular monolithic as one piece. "One piece" or "one part" means presently that the base section 27 and the bottom section 28 form a common component and are not assembled of different individual components. "Monolithic as one piece" means presently that the base section 27 and the bottom section 28 are manufactured throughout of the same material. For example, the housing bottom part 24 is an injection-molded plastic part.

The housing bottom part 24 comprises a fluid inlet 29 which is of a tubular configuration. The fluid inlet 29 is constructed with rotational symmetry in relation to a center or symmetry axis 30. The symmetry axis 30 is positioned perpendicularly to the symmetry axis 4. Through the fluid inlet 29, the fluid L to be purified can be supplied at the raw side to the filter element 3. Furthermore, the housing bottom part 24 comprises a fluid outlet 31 which is provided at the bottom section 28. The fluid outlet 31 is tubular and constructed with rotational symmetry in relation to the symmetry axis 4. Through the fluid outlet 31, the purified fluid L can be discharged from the filter element 3.

The fluid outlet 31 extends, beginning at the bottom section 28 of the housing bottom part 24, outwardly in the direction away from the filter element 3. Furthermore, as an extension of the fluid outlet 31, a tubular interface 33 (FIG. 8) extends into an interior 32 (FIGS. 3 to 6) of the housing bottom part and interacts with the interface 20 of the filter element 3 in order to seal the filter element 3 in relation to the housing bottom part 24. The interface 33 is of a tubular configuration and embodied with rotational symmetry in relation to the symmetry axis 4. The interface 33 can also be referred to as second interface or as filter housing interface.

At the inner side at the interface 33, this means facing away from the interface 20 of the filter element 3, a disturbance contour 34 is provided at the interface 33. The disturbance contour 34 is, for example, embodied as a plurality of grooves extending along the longitudinal direction LR. The disturbance contour 34 prevents that a filter element that does not belong to the filter system 1 can be mounted at the interface 33 which would radially inwardly seal relative to the interface 33.

The interface 33 extends, as mentioned before, from the bottom section 28 into the interior 32 of the housing bottom part 24. In this context, the interface 33 comprises a cylindrical seal surface 35 which is constructed with rotational symmetry in relation to the symmetry axis 4 and which interacts with the seal surface 17 of the filter element 3. In particular, the seal surfaces 17, 35, viewed in the radial direction R, are radially compressed with each other.

Viewed along the longitudinal direction LR, a nose or seal rib 36 extending circumferentially in an annular shape about the symmetry axis 4 adjoins the seal surface 35. The seal rib 36 is suitable to engage with form fit the seal groove 18 of the interface 20. Viewed in the longitudinal direction LR, a cylindrical centering surface 37 is provided behind the seal rib 36. The centering surface 37 is suitable to center or to guide the seal surface 17 of the filter element 3 upon installation thereof in the housing bottom part 24 in relation to the symmetry axis 4. Between the surface 19 and centering surface 37, a gap 38, in particular an air gap, is provided.

As illustrated in FIG. 9, at the bottom section 28 of the housing bottom part 24 disturbance geometries 39 are provided of which in FIG. 9 only one is provided with a reference character. For example, three or five such disturbance geometries 39 are provided which are arranged uniformly distributed around the symmetry axis 4. The number of disturbance geometries 39 is arbitrary. The disturbance geometries 39 are suitable to engage with form fit the positioning recesses 15 of the first end disk 9. The disturbance geometries 39 project, beginning at the bottom section 28, into the interior 32. The disturbance geometries 39 prevent furthermore the installation of a filter element, without positioning recesses 15 and not matching the filter system, into the housing bottom part 24.

Viewed from an end surface 40 (FIG. 8) of the bottom section 28 against which the end surface 16 rests, each disturbance geometry 39, viewed along the longitudinal direction LR, has a depth t39. In this context, the depth t39 is larger than the depth t18 and smaller than the depth t15. Each disturbance geometry 39 comprises an end surface 41 which is oriented parallel to the end surface 40 and spaced apart therefrom. The base section 12 of the first end disk 9 comprises an end surface 42. The end surfaces 41, 42 are positioned parallel to each other and spaced apart from each other.

In the housing bottom part 24, furthermore centering geometries 43 are integrally formed of which in FIGS. 2 and 9 only one is provided with a reference character, respectively. For example, three or five such centering geometries 43 can be provided which are arranged uniformly distributed around the symmetry axis 4. Each centering geometry 43 comprises a top edge 44 which is inclined at a slant relative to the symmetry axis 4.

The installation of the filter element 3 in the filter housing 2 will be explained in the following with the aid of FIGS. 4 to 6 and 8. First, the filter element 3 is inserted into the housing bottom part 24 in an insertion direction E which is oriented along the symmetry axis 4. The insertion direction E is oriented in this context from the second end disk 10 in the direction of the first end disk 9. The longitudinal direction LR and the insertion direction E can be oppositely oriented. In this context, a pre-centering of the filter element 3 by means of the plate-shaped base section 12 of the first end disk 9 at the centering geometries 43 takes place. By means of the centering geometries 43, the filter element 3 is centered in relation to the symmetry axis 4 so that the end surface 16 of the positioning and sealing section 14 of the first end disk 9 contacts the end surfaces 41 of the disturbance geometries 39 (FIG. 5). This means that the interfaces 20, 33 are not yet in engagement with each other.

From the position illustrated in FIG. 5, the filter element 3 can now be rotated about the symmetry axis 4 until the disturbance geometries 39 are aligned with the positioning recesses 15 of the positioning and sealing section 14 so that the filter element 3 can be pushed farther into the housing bottom part 24 along the insertion direction E. Upon rotation of the filter element 3 about the symmetry axis 4, the seal surface 17 of the first end disk 9 is guided at the centering surface 37 of the interface 33 and is centered in relation to the symmetry axis 4. As soon the disturbance geometries 39 engage the positioning recesses 15, the positioning and sealing section 14 is elastically deformed such that the seal rib 36 engages with form fit the seal groove 18. At the same time, the seal surfaces 17, 35 are radially compressed against each other. The end surfaces 16, 40 rest against each other. The filter element 3 is mounted in the housing bottom part 24.

The filter system 1 comprises furthermore a muffler 45 (FIGS. 1 to 3 and 7) which is attached to the fluid inlet 29. The muffler 45 is preferably a one-part plastic component, in particular monolithic as one piece. The muffler 45 can be an injection-molded plastic part. The muffler 45 is constructed with rotational symmetry in relation to the symmetry axis 30. The muffler 45 comprises at the exterior a plurality of fluid guiding ribs 46 which extend parallel to the symmetry axis 30. The fluid guiding ribs 46 are provided at the exterior at a tubular base body 47 of the muffler 45. The fluid L to be purified is supplied to the filter element 3 through the muffler 45.

The base body 47 comprises a truncated cone-shaped inlet 48 as well as an also truncated cone-shaped outlet 49. The inlet 48 and outlet 49 are in fluid communication with each other. The inlet 48 and outlet 49 are arranged such that the truncated cone-shaped geometries are positioned such that between the inlet 48 and outlet 49 a cross section constriction 51 that is rounded by a rounded portion 50 is provided. The inlet 48 is facing away from the fluid inlet 29. The outlet 49 is facing the fluid inlet 29. The inlet 48 and outlet 49 together form thus an hourglass-shaped or trumpet-shaped geometry. The outlet 49 comprises an inflow cross section A of the fluid inlet. The filter medium 5 is provided with inflow via the inflow cross section A.

At the inlet 48, furthermore an inlet rounded portion 52 is provided which extends circumferentially completely around the symmetry axis 30. The inlet rounded portion 52 extends circumferentially completely around an inlet opening 53 of the base body 47. The base body 47 passes into a tubular fastening section 54. The fastening section 54 can comprise snap hooks 55 by means of which the muffler 45 is connected to the fluid inlet 29 by form fit. Between the fastening section 54 and base body 47, a rib 56 extending circumferentially completely around the symmetry axis 30 can be provided. The rib 56 in this context is arranged perpendicularly to the symmetry axis 30. The rib 56 is received in the fluid inlet 29. The fluid guiding ribs 46 are provided at an exterior side 57 (FIGS. 1 and 2) of the base body 47. The outlet 49 comprises an outlet opening 58. A diameter of the outlet opening 58 is smaller than a diameter of the inlet opening 53.

In operation of the filter system 1, the fluid L to be filtered is sucked in around the inlet rounded portion 52 laterally into the inlet opening 53 and thus into the inlet 48, as illustrated in FIG. 7 by means of the arrows 59, 60. The fluid L flows thus along the fluid guiding ribs 46 which supply the fluid to the inlet 48. Through the base body 47, the fluid L flows along an in particular first flow direction SR1. The flow direction SR1 is oriented from the inlet opening 53 in the direction of the filter element 3. The fluid guiding ribs 46 extend along or parallel to the flow direction SR1.

The fluid L flows at the exterior at the base body 47 along the fluid guiding ribs 46 in an in particular second flow direction SR2. The flow directions SR1, SR2 are oppositely oriented. The flow direction SR2 is oriented along the radial direction R. The flow direction SR1, on the other hand, is oriented opposite to the radial direction R. The fluid guiding ribs 46 extend also along the flow direction SR2.

Immediately upstream of the inlet 48, a region 61 is provided in which the fluid L substantially has no movement. This means that the fluid L to be filtered is substantially sucked in only along the fluid guiding ribs 46 in the direction of the inlet rounded portion 52 and around the latter into the inlet 48. The sucked-in fluid L impacts on the filter medium 5, wherein the stabilization ring 6 prevents a movement of folds of the folded filter medium 5. In this context, the stabilization ring 6, viewed along the longitudinal direction LR, is positioned centrally in the inflow cross section A of the fluid inlet 29.

In particular, the filter medium 5 is protected by means of the stabilization ring 6 from pulsations. In this way, a noise reduction is provided. The stabilization ring 6 in this context is centrally arranged in relation to the muffler 45. This means the symmetry axis 30 extends preferably centrally through the stabilization ring 6. The double cone shape of the inlet 48 and of the outlet 49 provides for noise reduction.

REFERENCE CHARACTERS 1 filter system
2 filter housing
3 filter element 4 symmetry axis
5 filter medium
6 stabilization ring
7 end face
8 end face
9 end disk
10 end disk
11 passage
12 base section
13 cutout
14 positioning and sealing section
15 positioning recess
16 end surface
17 seal surface
18 seal groove
19 surface
20 interface
21 base section
22 positioning element
23 interior
24 housing bottom part
25 housing top part
26 quick connect closure
27 base section
28 bottom section
29 fluid inlet
30 symmetry axis
31 fluid outlet
32 interior
33 interface
34 disturbance contour
35 seal surface
36 seal rib
37 centering surface
38 gap
39 disturbance geometry
40 end surface
41 end surface
42 end surface
43 centering geometry
44 top edge
45 muffler
46 fluid guiding ribs
47 base body
48 inlet
49 outlet
50 rounded portion
51 cross section constriction
52 inlet rounded portion
53 inlet opening
54 fastening section
55 snap hook
56 rib
57 exterior side
58 outlet opening
59 arrow
60 arrow
61 region
A inflow cross section
E insertion direction
L fluid
LR longitudinal direction
R radial direction
RL clean side
RO raw side
SR1 flow direction
SR2 flow direction
t15 depth
t17 depth
t18 depth
t20 depth
t39 depth

What is claimed is:

1. A filter element for a filter system, the filter element comprising:
a filter medium;
a first end disk connected to the filter medium and a second end disk connected to the filter medium, wherein the filter medium is arranged between the first end disk and the second end disk;
wherein the first end disk comprises a positioning and sealing section facing away from the filter medium;
wherein the positioning and sealing section comprises externally arranged positioning recesses configured to engage disturbance geometries of a filter housing of the filter system with form fit and to position the filter element circumferentially in relation to the filter housing;
wherein the positioning and sealing section comprises an inner side and an interface arranged at the inner side, wherein the interface is configured to seal the filter element radially in relation to the filter housing and to position the filter element axially in relation to the filter housing;
wherein the interface, viewed along a longitudinal direction of the filter element oriented from the first end disk toward the second end disk, extends farther into the positioning and sealing section than the externally arranged positioning recesses;
wherein the interface comprises an annular seal groove surrounding circumferentially completely a symmetry axis of the filter element;
wherein the annular seal groove is configured to engage a seal rib of the filter housing with form fit and to position the filter element axially in relation to the filter housing;
wherein the interface comprises a circumferentially extending seal surface configured to seal the filter element radially in relation to the filter housing;
wherein the annular seal groove, viewed along the longitudinal direction, is arranged behind the circumferentially extending seal surface;
wherein the interface further comprises a circumferentially extending surface positioned such that the annular seal groove, viewed along the longitudinal direction, is arranged between the circumferentially extending seal surface and the circumferentially extending surface;
wherein the circumferentially, extending surface, viewed along the longitudinal direction, extends farther into the positioning and sealing section than the externally arranged positioning recesses; and
wherein the circumferentially extending surface comprises a larger diameter than the circumferentially extending seal surface.

2. The filter element according to claim 1, wherein the first end disk is open and the second end disk is closed.

3. The filter element according to claim 1, wherein the externally arranged positioning recesses are arranged uniformly distributed or non-uniformly distributed around a circumference of the filter element.

4. A filter system comprising:
a filter housing comprising disturbance geometries and a seal surface;
a filter element comprising:
a filter medium;

a first end disk connected to the filter medium and a second end disk connected to the filter medium, wherein the filter medium is arranged between the first end disk and the second end disk;

wherein the first end disk comprises a positioning and sealing section facing away from the filter medium;

wherein the positioning and sealing section comprises externally arranged positioning recesses engaging the disturbance geometries of the filter housing with form fit and positioning the filter element circumferentially in relation to the filter housing;

wherein the positioning and sealing section further comprises an inner side and an interface arranged at the inner side, wherein the interface is configured to seal the filter element radially in relation to the filter housing and to position the filter element axially in relation to the filter housing;

wherein the interface, viewed along a longitudinal direction of the filter element oriented from the first end disk toward the second end disk, extends farther into the positioning and sealing section than the externally arranged positioning recesses;

wherein the seal surface of the filter housing, at least in sections, radially compresses the interface of the filter element, and wherein a respective end surface of the disturbance geometries of the filter housing, viewed along the longitudinal direction, is arranged behind the seal surface of the filter housing.

5. The filter system according to claim 4, wherein the positioning and sealing section of the filter element, when installing the filter element in the filter housing, first contacts with an end face thereof the disturbance geometries, and wherein the disturbance geometries and the externally arranged positioning recesses are brought into form fit engagement with each other by rotating the filter element in relation to the filter housing.

6. The filter system according to claim 5, wherein a seal surface of the interface of the filter element, when installing the filter element in the filter housing, contacts the seal surface of the filter housing not until the disturbance geometries and the externally arranged positioning recesses are engaged with each other with form fit.

7. The filter system according to claim 6, wherein the disturbance geometries, viewed along the longitudinal direction, comprise a larger depth than the seal surface of the interface of the filter element.

8. The filter system according to claim 4, wherein the filter housing comprises a seal rib, wherein the interface of the filter element comprises an annular seal groove surrounding circumferentially completely a symmetry axis of the filter element, wherein the annular seal groove engages the seal rib of the filter housing with form fit and positions the filter element axially in relation to the filter housing, and wherein the seal rib of the filter housing, viewed along the longitudinal direction, is arranged behind the seal surface of the filter housing.

9. The filter system according to claim 8, wherein the filter housing comprises a centering surface, wherein the centering surface, viewed along the longitudinal direction, is arranged behind the seal rib of the filter housing.

10. The filter system according to claim 9, wherein a circumferentially extending gap is provided between the centering surface of the filter housing and the interface of the filter element when the filter element is in an installed position in the filter housing.

11. The filter system according to claim 4, wherein the disturbance geometries are arranged uniformly distributed or non-uniformly distributed around a circumference of the filter housing.

12. A filter element for a filter system, the filter element comprising:

a filter medium;

a first end disk connected to the filter medium and a second end disk connected to the filter medium, wherein the filter medium is arranged between the first end disk and the second end disk;

wherein the first end disk comprises a positioning and sealing section facing away from the filter medium;

wherein the positioning and sealing section comprises externally arranged positioning recesses configured to engage disturbance geometries of a filter housing of the filter system with form fit and to position the filter element circumferentially in relation to the filter housing;

wherein the positioning and sealing section comprises an inner side and an interface arranged at the inner side, wherein the interface is configured to seal the filter element radially in relation to the filter housing and to position the filter element axially in relation to the filter housing;

wherein the interface, viewed along a longitudinal direction of the filter element oriented from the first end disk toward the second end disk, extends farther into the positioning and sealing section than the externally arranged positioning recesses;

wherein the interface comprises an annular seal groove surrounding circumferentially completely a symmetry axis of the filter element;

wherein the annular seal groove is configured to engage a seal rib of the filter housing with form fit and to position the filter element axially in relation to the filter housing;

wherein the interface comprises a circumferentially extending seal surface configured to seal the filter element radially in relation to the filter housing;

wherein the annular seal groove, viewed along the longitudinal direction, is arranged behind the circumferentially extending seal surface; and wherein the externally arranged positioning recesses, viewed along the longitudinal direction, project farther into the positioning and sealing section than the circumferentially extending seal surface.

13. The filter element according to claim 12, wherein the first end disk is open and the second end disk is closed.

14. The filter element according to claim 12, wherein the externally arranged positioning recesses are arranged uniformly distributed or non-uniformly distributed around a circumference of the filter element.

15. The filter element according to claim 12, wherein the interface comprises a circumferentially extending surface positioned such that the circumferentially extending annular seal groove, viewed along the longitudinal direction, is arranged between the circumferentially extending seal surface and the circumferentially extending surface, and wherein the circumferentially extending surface, viewed along the longitudinal direction, extends farther into the positioning and sealing section than the externally arranged positioning recesses.

16. The filter element according to claim 15, wherein the circumferentially extending surface comprises a larger diameter than the circumferentially extending seal surface.

* * * * *